United States Patent

[11] 3,591,756

| | | |
|---|---|---|
| [72] | Inventor | Charles A. Timko<br>Westmont, Ill. |
| [21] | Appl. No. | 883,518 |
| [22] | Filed | Dec. 9, 1969 |
| [45] | Patented | July 6, 1971 |
| [73] | Assignee | Continental Can Company, Inc.<br>New York, N.Y. |

[54] TIMED-HYDRAULIC DAMPENER FOR SUPPRESSION OF ELECTRODE BOUNCE IN WELDING OF CAN BODY SEAMS
9 Claims, 2 Drawing Figs.

[52] U.S. Cl. .................................................. 219/66,
219/59, 219/64, 219/82
[51] Int. Cl. ...................................................... B23k 1/16,
B23k 11/06
[50] Field of Search .......................................... 219/59, 64,
62, 66, 67, 79, 80, 81—84, 117 HD

[56] References Cited
UNITED STATES PATENTS

| 1,124,258 | 1/1915 | Bates | 219/64 X |
| 1,808,261 | 6/1931 | Sessions | 219/64 |
| 2,204,549 | 6/1940 | Murch | 219/64 |
| 2,294,418 | 9/1942 | Murch | 219/64 |
| 2,957,975 | 10/1960 | Pearson | 219/82 |

*Primary Examiner*—J. V. Truhe
*Assistant Examiner*—L A. Schutzman
*Attorney*—Diller, Brown, Ramik & Holt ABSTRACT: This disclosure relates to a dampener for suppressing the normal electrode bounce which occurs when lapped portions to be welded move in between a pair of roller electrodes and force the electrodes apart. The dampener is particularly constructed to be operable primarily at the time the lapped portions move in between the electrodes.

PATENTED JUL 6 1971 3,591,756

INVENTOR
CHARLES A. TIMKO

BY *Drew, Brown, Ramik & Holt*
ATTORNEYS

TIMED-HYDRAULIC DAMPENER FOR SUPPRESSION OF ELECTRODE BOUNCE IN WELDING OF CAN BODY SEAMS

This invention relates in general to new and useful improvements in apparatus for the welding of tubular members, and more particularly relates to a welding apparatus particularly adapted for the sequential welding of lap seams in tubular members.

In a customary welding apparatus for tubular members, such as can bodies, the tubular members are moved along a horn with the adjacent tubular members being spaced apart a predetermined distance. As a welded tubular member passes from between a pair of roller electrodes, the means normally urging the roller electrodes together bring the roller electrodes into contact with one another. Then as the next tubular member to be welded advances to the roller electrodes, the lapped edge portion thereof are forced in between the roller electrodes with the result that the movable roller electrode is forced away from the fixed electrode at a rapid rate. Although the movable roller electrode is constantly urged towards the fixed roller electrode, bounce frequently occurs with undesired resulting arcing between the roller electrode and the tubular member and improper welding of a seam thereof.

In accordance with this invention it is proposed to incorporate in the apparatus for urging the movable roller electrode towards the fixed roller electrode, a dampener. The function of the dampener is to suppress the bounce encountered as the electrodes impinge upon the edge of the lap seam to be welded.

Although a dampener will eliminate or minimize the bounce of the movable electrode, the mere provision of a constant acting dampener is not sufficient. There are disturbances to the welding electrode during the remaining part of the welding cycle which causes the dampener to have a detrimental effect.

It is, therefore, another object of this invention to provide a dampener which is incorporated in the mechanism for urging a movable roller electrode towards a fixed roller electrode during a welding operation, the dampener having incorporated therein means for rendering the same inoperative during the normal welding cycles and being operable primarily at the time the leading edge of a tubular member to be welded impinges on the roller electrodes.

Another object of this invention is to provide a dampener in conjunction with apparatus for applying a predetermined load on a movable roller electrode, the dampener having a bypass system which is open during a normal welding cycle and which is closed as the roller electrodes come together between adjacent tubular members being welded whereby the dampener is effective as a next following tubular member engages the electrodes.

Another object of this invention is to provide the bypass assembly of the dampener with automatic controls for operating the same in accordance with the movement of tubular members relative to the roller electrodes.

A further object of this invention is to provide a dampener with a piston which is spaced from the cylinder of the dampener and wherein an orifice is formed between the piston and cylinder, thereby eliminating the need for the usual seals between the piston and cylinder. In addition, by shaping the orifice, a higher drag coefficient to oppose bounce motion as compared to the drag coefficient in the opposite direction is obtained.

With the above and other objects in view that will hereinafter appear, the nature of the invention will be more clearly understood by reference to the following detailed description, the appended claims and the several views illustrated in the accompanying drawing:

Figure 1:
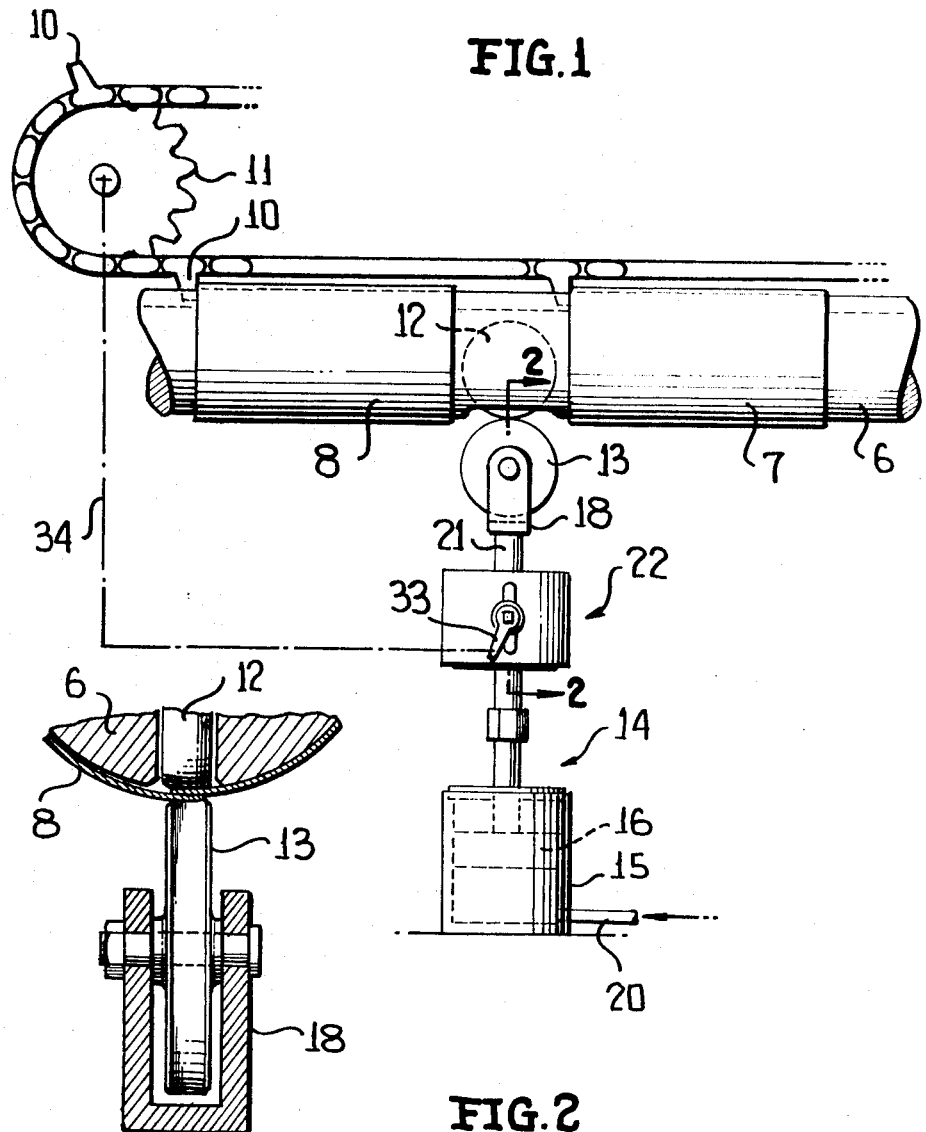
FIG. 1 is a schematic side elevational view of the welding apparatus for welding lap seams of tubular members and shows the spacing between adjacent tubular members aligned with the roller electrodes of the welding apparatus.

Referring now to the drawings in detail, it will be seen that there is illustrated in FIG. 1 welding apparatus which is formed in accordance with this invention, the welding apparatus being generally identified by the numeral 5. The welding apparatus 5 includes a horn 6 along which tubular members pass in supported relation. There is illustrated as being mounted on the horn 6 a welded tubular member 7 and a tubular member 8 which is to be next welded.

The tubular members 7 and 8 are moved in constantly spaced relation relative to one another along the horn 6 by means of an endless conveyor chain 9 having uniformly spaced lugs 10 projecting therefrom. The endless chain 9 may be supported and driven in any desired manner including by means of a sprocket 11 which is driven at the desired rate for the welding apparatus 5.

In order to effect the welding of the lap seams of the tubular members, there is provided a fixed roller electrode 12 and a movable roller electrode 13. The fixed roller electrode 12, which may be considered the inner electrode, is suitably mounted within the horn 6. The movable roller electrode 13, which may be considered the outer electrode, is supported by a suitable pressure-applying apparatus, which apparatus is generally identified by the numeral 14.

Basically the apparatus 14 includes a cylinder 15 having a piston 16 mounted therein. The piston 16 carries a piston rod 17 which is suitably connected to a support 18 for the movable roller electrode 13. The support 18 has been simply illustrated as being in the form of a yoke although it will be readily apparent that in practice a more stable type of support is provided.

The cylinder 15 is provided with a fluid supply line 20 through which a fluid is supplied at a predetermined pressure to urge the movable roller electrode 13 towards the fixed roller electrode 12 with a predetermined force. Inasmuch as the pressure-applying apparatus 14 is of itself not a part of this invention, it will not be described further except to state that the support 18 may be carried by a suitable rod 21.

The pressure-applying apparatus 14, in accordance with this invention, has incorporated therein a dampener or dash pot which is generally referred to by the numeral 22. It is to be noted that the dampener 22 is associated with the rod 21, with the rod 21 being a part thereof.

Basically, the dampener 22 includes a cylinder 23 having heads or ends 24, 25 having bores through which the rod 21 passes, the rod 21 functioning as a piston rod of the dampener 22. The piston 23 is sealed relative to the rod 21 by means of suitable sealing rings 26.

The dampener 22 also includes a piston 27 which is mounted within the cylinder 23 and is carried by an intermediate portion of the rod 21. It is to be noted that the piston 27 is of a size to be spaced from the wall of the cylinder 23 with the space between the piston 27 and the cylinder 23 defining an orifice.

It is to be understood that the cylinder 23 is normally filled with a suitable fluid, including either air or a liquid, such as hydraulic oil, with the latter being preferred. It will be readily apparent that the rate of movement of the piston 27 relative to the cylinder 23 will be controlled by the shape and size of the orifice 28. Inasmuch as the cylinder 23 is fixedly secured to a suitable support, it will thus be apparent that due to the restricted rate of movement of the piston 27, a dampening effect will be placed upon the roller electrode 13 through the rod 21 and the support 18.

In view of the fact that it is not desired that the dampener 22 function during a normal welding operation, the dampener 22 is provided with a bypass assembly which is generally identified by the numeral 30. Basically, the bypass assembly 30 includes a bypass line 31 which is in communication with the interior of the cylinder 23 on opposite sides of the normal path of movement of the piston 27. The bypass line 31 has incorporated therein a valve 32 which may be moved to a position completely closing the bypass line 31. The valve 32 is provided with an operator 33.

In accordance with this invention, it is proposed that at the time a tubular member is positioned between the roller electrodes 12 and 13 and a welding operation is being performed, the valve 32 be open so that the fluid may freely circulate from one end of the cylinder 23 to the other so that the dampener 22 is rendered ineffective and has no effect whatsoever on the movement of the roller electrode 13. However, as the trailing edge of the tubular member welded passes from between the roller electrodes 12 and 13, it is desired that the valve 32 be moved to a closed position so that the dampener 22 becomes effective. Then, as the leading edge of the next tubular member, such as the tubular member 8, enters in between the roller electrodes 12 and 13, the dampener 22 will be effective to eliminate or minimize electrode bounce.

It is to be understood that the valve 32 will be automatically operated. The valve 32 may be actuated by moving the actuator 33 thereof in timed sequence to the movement of the tubular members past the roller electrodes. In FIG. 1 there is illustrated a diagrammatic connection 34 between the actuator 33 and the sprocket 11. It is to be understood that any suitable coupling may be made between the sprocket 11 and the actuator 33 so as to either constantly rotate the actuator 33 or to oscillate the actuator 33, as is required to effect the necessary timing of the opening and closing of the valve 32 with the movement of the tubular members to be welded. Inasmuch as the synchronization of the operation of the valve 32 with the movement of the tubular members to be welded may be obtained by many conventional mechanical linkages, no attempt has been made here to more specifically disclose such linkage.

Figure 2:
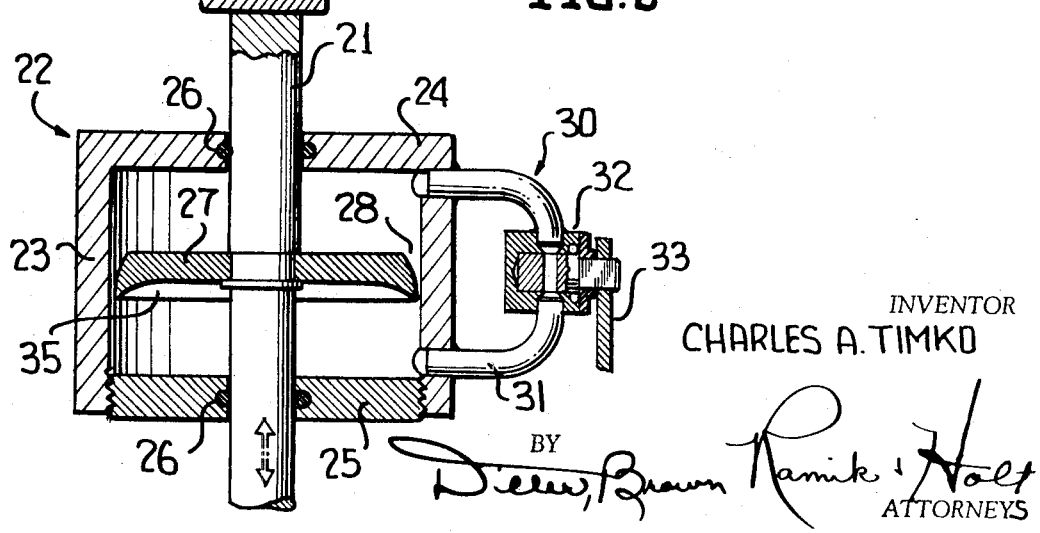
FIG. 2 is an enlarged fragmentary vertical sectional view taken along the line 2-2 of FIG. 1, but shows lapped seam portions being welded in between the electrodes, there also being shown the specific details of the dampener.

A further and important feature of the invention is the particular shape of the piston 27. As is clearly shown in FIG. 2, a peripheral wall of the piston 27 is longitudinally curved in cross section. As a result, the orifice 22 is of a curvingly flared section. Thus, when the piston moves upwardly, as viewed in FIG. 2, the fluid in the upper part of the cylinder 23 will be freely directed into the orifice 28 and the desired freedom of bypass of the fluid relative to the piston 27 will occur. On the other hand, when the piston moves downwardly, as will occur when a tubular member is forced between the roller electrodes 12 and 13, the fluid in the lower portion of the cylinder 23 will not be directed through the orifice 28. As a result, the piston and cylinder assembly of the dampener 22 will have a higher drag coefficient to oppose bounce motion as compared to the drag coefficient in the opposite direction.

It will also be noted that the underside of the piston 27 is scooped out as at 35. This scooped configuration of the piston 27 directs fluid in the lower portion of the cylinder 23 away from the orifice 28. This also has a direct effect on the drag coefficient of the piston and cylinder assembly in that it directs the fluid in the lower portion of the cylinder 23 away from the orifice 28.

Although only a preferred embodiment of the dampener has been specifically illustrated and described herein, it is to be understood that minor variations may be made in the dampener without departing from the spirit of the invention.

I claim:

1. An apparatus for welding lap seams of moving spaced apart tubular members comprising a support for guiding tubular members along a predetermined path and means for sequentially moving tubular members along said support, inner and outer opposed roller electrodes, pressure means for urging said electrodes together under a continuous pressure, and control means intermediate said pressure means and said electrodes for eliminating electrode bounce by retarding the movement of said electrodes apart as a leading edge of a tubular member passes in between said electrodes while permitting substantially freedom of movement of said electrodes during a welding operation as dictated by said pressure means.

2. The apparatus of claim 1 wherein said control means is in the form of a dash pot.

3. The apparatus of claim 1 wherein said control means is in the form of a dash pot and said dash pot having a bypass assembly operable during welding to render said dash pot inoperative.

4. The apparatus of claim 3 wherein said bypass assembly includes a control valve, and means for operating said control valve in timed relation to the movement of tubular members relative to said electrodes.

5. The apparatus of claim 3 wherein said bypass assembly includes a control valve, and means connected to said means for sequentially moving tubular members for operating said control valve in timed relation to the movement of tubular members relative to said electrodes.

6. The apparatus of claim 1 wherein said control means is in the form of a dash pot, said dash pot including a piston particularly adapted to having different pumping actions for different directions of movement thereof.

7. The apparatus of claim 1 wherein said control means is in the form of a dash pot, said dash pot including a piston particularly adapted to having different pumping actions for different directions of movement thereof, one face of said piston having a scooped out configuration and the other face of said piston having a tapered peripheral edge.

8. The apparatus of claim 1 wherein said control means is in the form of a dash pot, said dash pot including a cylinder and a piston with there being a predetermined spacing of said piston from said cylinder to form an orifice.

9. The welding apparatus of claim 8 wherein said clearance flares in the direction opposite to piston bounce to provide a higher drag coefficient in the direction of bounce as opposed to the drag coefficient in the opposite direction.